United States Patent [19]

Nagase et al.

[11] Patent Number: 5,323,371
[45] Date of Patent: Jun. 21, 1994

[54] DISK STORAGE IN WHICH DIRECTION OF INSERTING DISK IS APPROXIMATELY ORTHOGONAL TO DIRECTION OF SEEKING BY HEAD

[75] Inventors: Fumio Nagase, Tama; Hidetoshi Kabasawa, Higashimurayama, both of Japan

[73] Assignee: Teac Corporation, Japan

[21] Appl. No.: 755,110

[22] Filed: Sep. 5, 1991

[30] Foreign Application Priority Data

Sep. 10, 1990 [JP] Japan .................................. 2-239444

[51] Int. Cl.⁵ .............................................. G11B 33/06
[52] U.S. Cl. .................................... 369/75.2; 369/77.1; 369/77.2; 360/133
[58] Field of Search ................ 369/75.2, 75.1, 77.1, 369/77.2; 360/99.06, 133, 99.02, 99.03, 106

[56] References Cited

U.S. PATENT DOCUMENTS

| | | | |
|---|---|---|---|
| 4,758,909 | 7/1988 | Harase | 360/106 |
| 4,829,394 | 5/1989 | Tokuda et al. | 360/106 |
| 5,063,554 | 11/1991 | Uehara | 369/77.2 |
| 5,164,935 | 11/1992 | Shimegi et al. | 369/77.2 |

FOREIGN PATENT DOCUMENTS 177472 12/1989 Japan .

Primary Examiner—Paul M. Dzierzynski
Assistant Examiner—Don Wong
Attorney, Agent, or Firm—Andrus, Sceales, Starke & Sawall

[57] ABSTRACT

A disk storage in which a first dimension in which a disk is inserted/ejected a disk is approximately orthogonal to a second dimension in which a head seeks. A housing which accommodates a disk has an opening portion via which a head seeks a desired track on the disk. The opening portion is aligned in the second dimension. Since the head moves in the second dimension, it is not necessary to provide a space in the first dimension for moving the head. Therefore, the disk storage according to the present invention can be made thinner in the first dimension than the conventional disk storage in which the head moves through the opening portion in the first dimension.

4 Claims, 5 Drawing Sheets

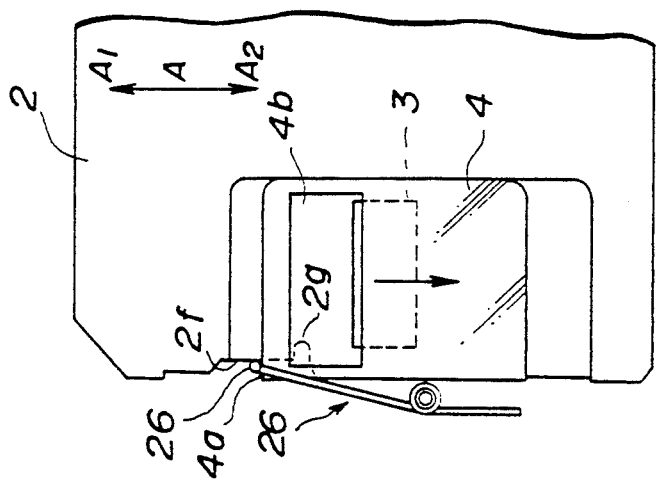
FIG. 7A
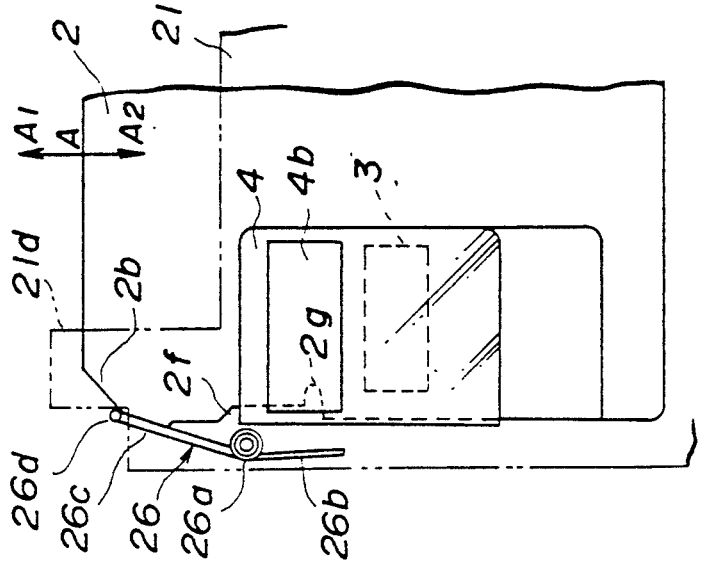
FIG. 7B
FIG. 7C

DISK STORAGE IN WHICH DIRECTION OF INSERTING DISK IS APPROXIMATELY ORTHOGONAL TO DIRECTION OF SEEKING BY HEAD

BACKGROUND OF THE INVENTION

The present invention relates generally to disk storages, and more particularly to a disk storage in which a direction of inserting a disk is approximately orthogonal to a direction of seeking by a head.

As shown in FIG. 1, a so-called floppy disk 2a is accommodated in a disk cartridge 2 having an almost quadrate surface. The disk cartridge 2 has an opening portion 3 which extends in a radial direction of the disk 2a. When the disk cartridge 2 is inserted into a conventional disk storage 1 in a direction $A_1$, a shutter 4 which shuts the opening portion 3 is moved in a direction $B_1$ orthogonal to a dimension A so as to open the opening portion 3. Hereupon, the term "a dimension A", as used herein, includes the directions $A_1$ and $A_2$ shown in FIG. 1. As is the same as a dimension B. Thus, as shown in FIG. 1, a head 6 moves through the opening portion 3 and records information on a desired track and/or reproduces information therefrom. The head 6 is moved in the dimension A by a driving device 9 comprising a step motor 7 and a lead screw 8 which are aligned in the dimension A. The head 6 is engaged with the lead screw rotated by the step motor 7 and is moved along the lead screw 8. Thus, in the conventional disk storage 1, a direction in which a disk cartridge 2 is inserted, a longitudinal direction in which the opening portion 3 extends, a direction of seeking by the head 6, and respective directions in which the step motor 7 and the lead screw 8 are aligned respectively correspond to the dimension A.

However, the conventional disk storage 1 has the following disadvantage in that it cannot be made thinner in the dimension A because of a space 10 shown in FIG. 1. In addition, only a part of the space 10 is used for the moving of the head 6 at the opening portion 3 and for arranging the driving device 9 and the arm 5 therein. Such a disadvantage is serious as to miniaturize the disk cartridge has been the object of much effort in many countries.

SUMMARY OF THE INVENTION

Accordingly, it is a general object of the present invention to provide a novel and useful disk storage in which the above disadvantages are eliminated.

Another object of the present invention is to provide a disk storage whose length in a direction in which a disk is inserted therein is shortened.

The more specific object of the present invention is to provide a disk storage which comprises a holder into/from which a housing accommodating a disk and having an opening portion in a first dimension radial to the disk is inserted/ejected in a second dimension approximately orthogonal to the first dimension, a head, engaged with the holder, which records information at a predetermined position on the disk via the opening portion and/or reproduces information therefrom when the housing is inserted into the holder, and head moving means, engaged with the head, for moving the head in the first dimension to the predetermined position.

According to the present invention, since the head moves in the first dimension to the desired position on the disk, it is not necessary to provide a space in the second dimension requisite for the moving of the head Therefore, the length of the disk storage in the housing according to the present invention can be shortened in the second dimension than the conventional disk storage in which the head moves through the opening portion in the second dimension.

Other objects and further features of the present invention will be apparent from the following detailed description when read in conjunction with the accompanying drawings.

BRIEF DESCRIPTION OF THE DRAWINGS

FIG. 7a-c show various plane views for explaining an operation of an arm of the disk storage shown in FIG. 3.

DETAILED DESCRIPTION OF THE PREFERRED EMBODIMENTS

Figure 2:
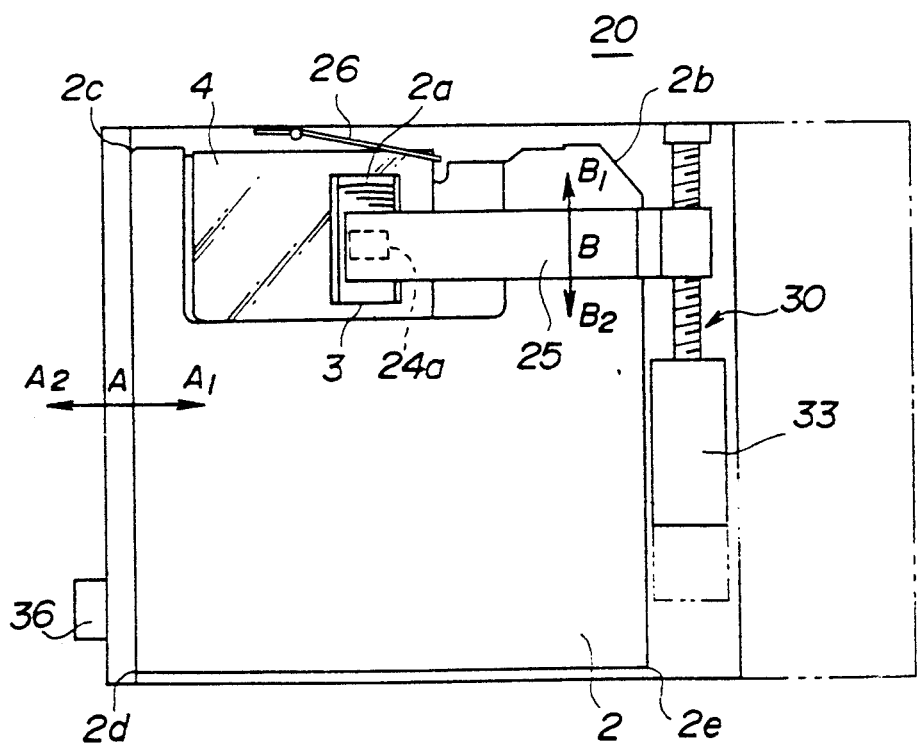
FIG. 2 shows a principle plane view of a disk storage according to the present invention.

The disk storage 20 according to the present invention is, as shown in FIG. 2, a magnetic disk storage, for example, and the disk cartridge 2 is inserted into the disk storage 20 and/or ejected therefrom in the dimension A while the opening portion 3 is aligned in the dimension B orthogonal to the dimension A. When the cartridge 2 is to be inserted with a correct orientation, a loading mechanism of the disk cartridge 20 loads the cartridge 2 in the storage. On the other hand, when the cartridge 2 is to be inserted with a wrong orientation, an erroneous insertion preventing mechanism of the storage prevents the cartridge 2 from being further inserted. When the disk cartridge 2 is loaded in the disk storage 20, a shutter on-off mechanism of the storage moves the shutter 4 in the direction $A_2$ to expose the opening portion 3. Subsequently, a head moving mechanism of the storage moves a head 24a in the dimension B to a desired track on a disk 2a via the opening portion 3. A description will now be given of each of the above mechanisms.

Figure 3:
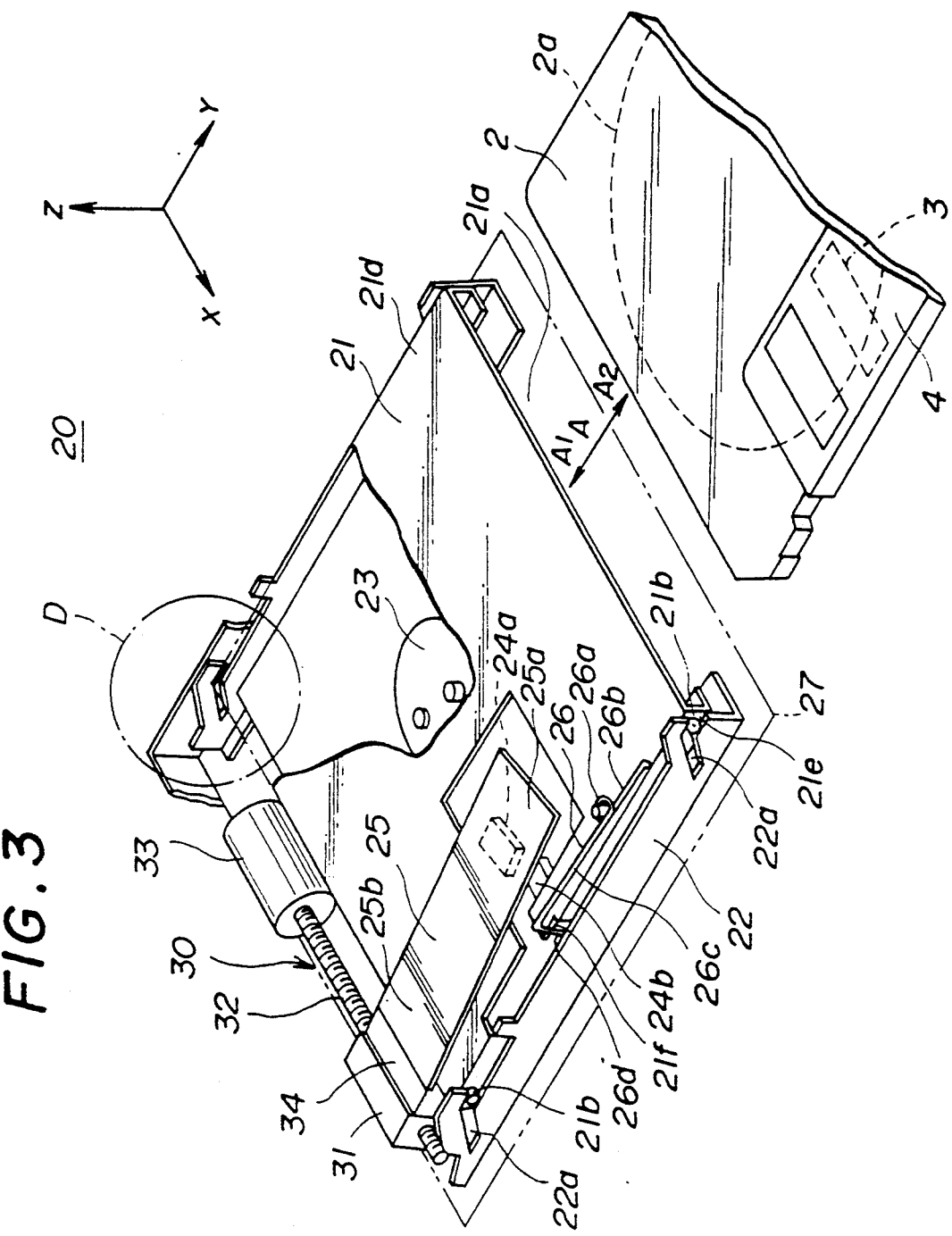
FIG. 3 shows a principle perspective view of the disk storage according to the present invention.
Figure 4:
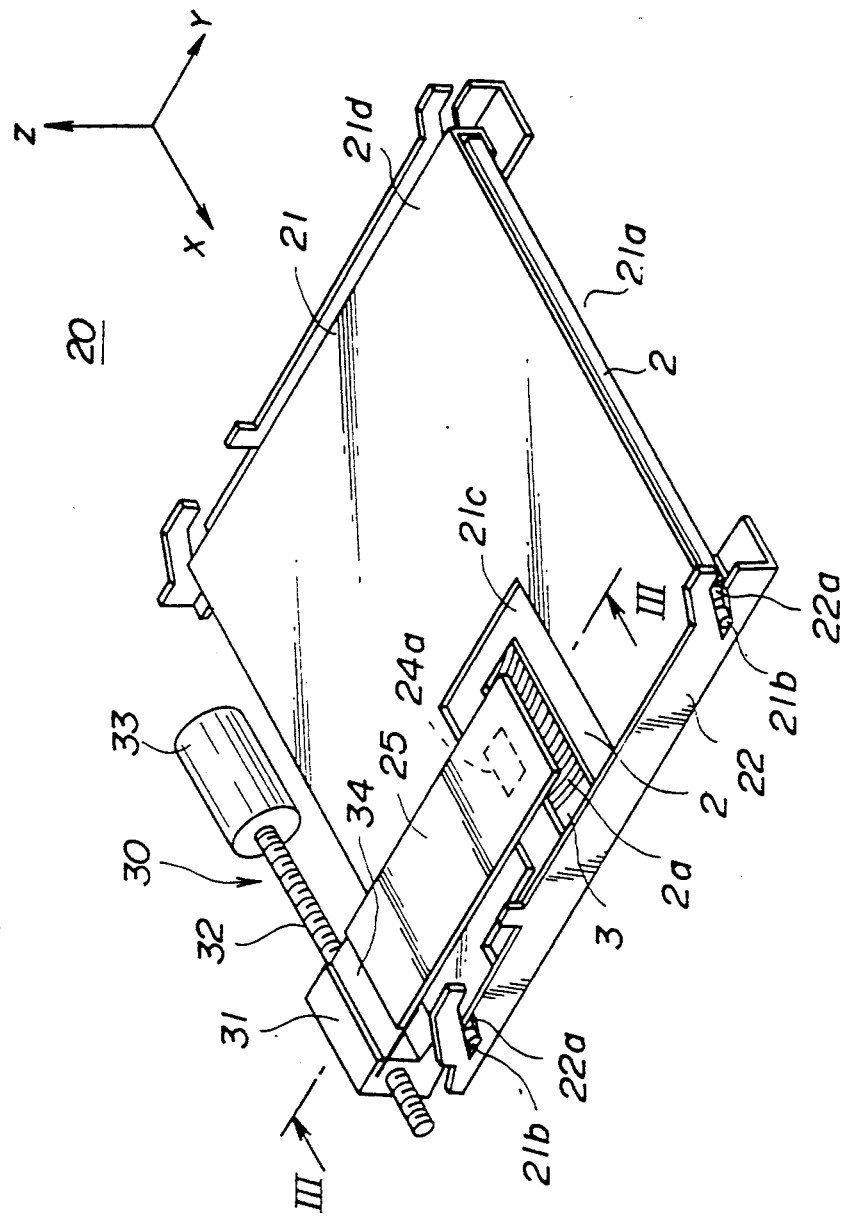
FIG. 4 shows a perspective view of the disk storage shown in FIG. 3 in which a disk is inserted.
Figure 5:
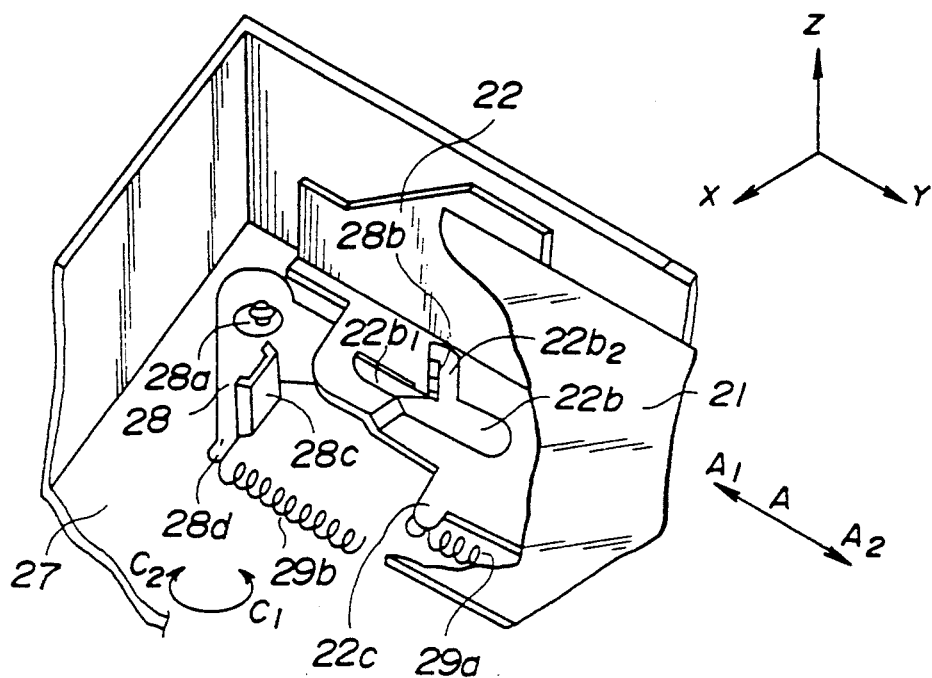
FIG. 5 shows a perspective section which is an enlarged view of a part of the disk storage enclosed by a line D shown in FIG. 3.

First a description will be given of the loading mechanism which loads the disk cartridge 2 into the disk storage 20 with reference to FIGS. 3 to 5. The loading mechanism comprises, as shown in FIG. 3, a holder 21, a slider 22 and a latch lever 28. The holder 21 has, as shown in FIGS. 3 and 4, an insertion opening 21a, projecting pins 21b and an opening portion 21c. The slider 22 comprises, as shown in FIGS. 3 to 5, guiding grooves 22a, an engaging groove 22b and an engaging end 22c. The latch lever 28 comprises, as shown in FIG. 5, a rotating hole 28a, a tab 28b, a touching part 28c and an engaging end 28d. The holder 21 and the slider 22 are engaged with each other via respective projecting pins 21b and guiding grooves 22a. The slider 22 engages slidably in the dimension A with the frame 27, which is a base of the disk storage 20. The slider 22 and the latch lever 28 are engaged with each other via an engaging groove 22b and a tab 28b.

The holder 21, which holds the cartridge 2, ascends and descends between a first position shown in FIG. 3 and a second position shown in FIG. 4 When the holder 21 is located at the first position, the cartridge 2 is inserted therein via the insertion opening 21a in the direction $A_1$, and is ejected therefrom in the direction $A_2$. When the holder 21 is located at the second position, the disk 2a is rotated by a turn table shown in FIG. 3, and information is recorded on the disk and/or reproduced therefrom. Incidentally, the present invention can be applied to a holder which does not ascend and descend. The holder 21 has a quadrate upper surface 21d and two elongated and rectangular side surfaces 21e vertical to the insertion opening 21a and the upper surface 21d. The upper surface 21d has the opening portion 21c at a position corresponding to the opening portion 3 when the cartridge is inserted into the holder 21. The two side surfaces 21e respectively have two projecting pins.

The slider 22 has oblique guiding grooves 22a which are respectively correspond to the projecting pins 21b of the holder 21 so that the holder 21 can ascend and descend between first and second positions. As shown in FIG. 5, since the engaging end 22c of the slider 22 is engaged with a tension spring 29a, the slider 22 is forced in the direction $A_2$. When the holder 21 moves from the first position to the second position, the slider 22 slides in the direction $A_1$ against the force of the tension spring 29. As shown in FIG. 5, when the holder 21 moves to the second position, the slider 22 is fixed by the latch lever 28. Thus, the disk 2a is stably rotated by the turn table 23.

The latch lever 28 is rotatably engaged with the frame 27 via the rotating hole 28a. Since the engaging end 28d of the latch lever 28 is engaged with the tension spring 29b, the latch lever 28 is forced counterclockwise (in a direction $C_1$) in FIG. 5. The tab 28b of latch lever 28 extends in a direction Z. When the holder 21 is located at the first position, the tab 28b is located at a first part $22b_1$ in the engaging groove 22b of the slider 22 so as to fix the slider 22 which is forced in the direction $A_2$. As the slider 22 moves in the direction $A_1$, the tab 28b moves in the direction $A_2$ in the first part $22b_1$ of the engaging groove 22b, then engages with a second part $22b_2$ in the engaging groove 22b due to the tension spring 29b, and thus fixes the slider 22. When the eject button 36 shown in FIG. 2 is pushed, the touching part 28c of the latch lever 28 rotates clockwise (in a direction $C_2$) as shown in FIG. 5. If the eject button 36 is pushed while the tab 28b is being engaged with the second part $22b_2$ in the engaging groove 22b, the latch lever 28 rotates in the direction $C_2$ and thus the tab 28b moves from the second part $22b_2$ to the first part $22b_1$ in the engaging part 22b. Thus, the spring 29a slides the slider 22 in the direction $A_2$, and thus the holder 21 is moved from the second position to the first position.

A description will now be given of the erroneous insertion preventing mechanism which prevents the cartridge 2 from being inserted with a wrong orientation. Hereupon, the term, "wrong", as used herein, includes a case, in this embodiment, where the cartridge 2 is not inserted as shown in FIG. 2. The erroneous insertion preventing mechanism comprises an almost L-shaped arm 26. The arm 26 includes a hole 26a, a first arm part 26b, a second arm part 26c and a third arm part 26d. The arm 26 is pivotally mounted, as shown in FIGS. 3 and 7, on the holder 21 via a shaft fixed on the holder 21 with which the hole 26a is engaged.

Incidentally, FIG. 7A is a plane view showing the arm 26a which touches a corner 2b of the disk cartridge inserted in with a correct orientation. FIG. 7B is a plane view showing the arm 26a which touches the shutter 4 of the cartridge 2 inserted with the correct orientation. FIG. 7C is a plane view showing the arm 26 which touches a corner 2c of the cartridge 2 inserted with the wrong orientation.

The first arm part 26b is fixed on the holder 21. The first arm part 26b and the second arm part 26c are combined with each other via the hole 26a. The third arm part 26d is formed by bending the second arm part 26c in a direction opposite to the direction Z. Thus, the third arm part 26d is forced clockwise in FIG. 7. The third arm part 26d is held at a holding part 21f of the holder 21 shown in FIG. 3 and projects into the holder 21 before the cartridge 2 is inserted.

In the conventional disk cartridge 2, as shown in FIG. 2, one corner 2b is chamferred quite a lot and other corners 2c to 2e are not chamferred very much. Incidentally, the cartridge 2 shown in FIG. 2 has a layout similar to a magnetic disk cartridge or a CD-ROM. However, the present invention can also be applied to a cartridge, such as a magneto-optical disk cartridge in which the corner 2c is chamferred quite a lot. In this case, the cartridge is inserted from the corners 2c and 2d into the holder 21.

The third arm part 26d of the arm 26 touches to the chamferred corner 2b of the cartridge 2, when the cartridge 2 is to be inserted with the correct orientation, and rotates counterclockwise to allow the cartridge 2 to be inserted in the direction $A_1$. On the other hand, when the cartridge 2 is to be inserted with the wrong orientation, since the third arm part 26d cannot touch one of the chamferred corners 2c to 2e, the third arm part 26d engages with the surface of the cartridge 2 parallel to the dimension B so as not to prevent the cartridge 2 from being inserted in the direction $A_1$. Incidentally, if the holder which does not ascend and descend is used, the arm 26 may engage with only the frame 27, not engage with the holder 21.

A description will now be given of the shutter on-off mechanism which moves the shutter 4 of the cartridge 2 so as to expose the opening portion 3 when the cartridge 2 is inserted with the correct orientation. Hereupon, the term, "correct", as used herein, means a case where the cartridge 2 is inserted as shown in FIG. 2. Since the arm 26 also serves as the shutter on-off mechanism, the number of needed components is reduced thus contributing to the miniaturization of the disk cartridge 20. When the cartridge 2 is inserted into the holder 21, the shutter 4 is forced in the direction $A_1$ shown in FIG. 2 so as to close the opening portion 3. When the cartridge 2 is to be inserted with the correct orientation the arm 26 allows the cartridge 2 to be inserted, as shown in FIG. 7, in the direction $A_1$. Since the third arm part 26d of the arm 26 is forced clockwise in FIG. 7A, as shown in FIG. 7B, the third arm part 26d consequently is inserted into a first concave part 2f of the cartridge 2 and touches an end part 4a of the shutter 4. As the cartridge 2 is inserted into the holder 21, the third arm 26d moves the shutter 4 along the first concave part 2f in the direction $A_2$ and exposes the opening portion 3. Then, the third arm part 26d is inserted into a second concave part 2g of the cartridge 2 shown in FIGS. 7A and 7B and fixed therein. When the third arm part 26d is engaged with the second concave part 2g and an opening portion 4b of the shutter 4 corresponds to the opening portion 3, the opening portion 3 is exposed.

The disk storage 20 according to the present invention comprises dual type heads 24a and 24b opposite to each other. When the holder 21 is located at the second position, the heads 24a and 24b respectively record information on a desired track on a disk 2a and/or reproduce information therefrom via the opening part 3. Before a description of a head moving mechanism which moves the heads 24a and 24b to a desired track is given, a description will be given of the relationship between the insertion of the cartridge 2 and the arrangement of the heads 24a and 24b.

Figure 6:
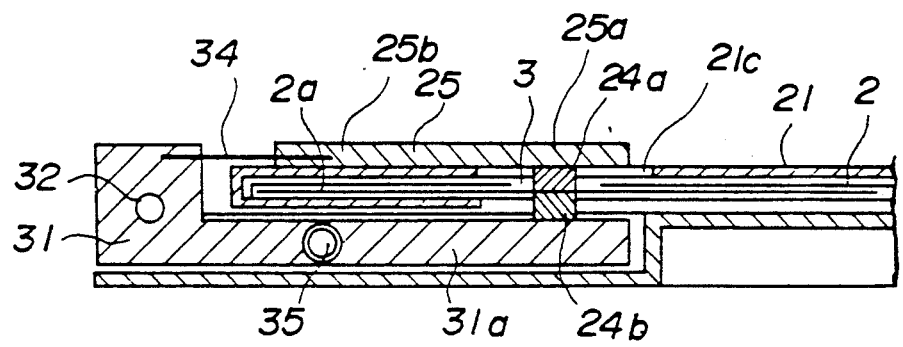
FIG. 6 shows a cross-sectional view of the disk storage taken along a line III—III shown in FIG. 4.

As shown in FIGS. 2, 4 and 6, the upper head 24a is attached to one end 25a of the head arm 25. On the other hand, the lower head 24b is attached to the top of a fixed arm part 31a of a head carriage 31. The head arm 25 and the fixed arm part 31a are respectively arranged so as to hold the holder 21. The head arm 25 is rotatably engaged with the head carriage 31 via a plate hinge 34. When the holder 21 is located at the second position, as shown in FIG. 6, the head arm 25 is arranged to be approximately horizontal and the upper head 24a touches the disk 2a via the opening portions 21c and 3. However, when the holder 21 is located at the first position, as shown in FIG. 3 and the end part 25b opposite to the end part 25a is pushed by the holder 21, the head arm 25 is inclined so that the end part 25a can ascend. On the other hand, as shown in FIG. 6, since the lower head 24b touches the disk 2a in the holder 21 located at the second position, the lower head 24b is spaced apart from the holder 21 located at the first position. Lastly, since the respective heads 24a and 24b are spaced apart from the holder 21, the holder 21 does not crash into the heads 24a and 24b even if the cartridge 2 is to be inserted into the holder 21. When the cartridge 2 is inserted into the holder 21 and then the holder 21 moves from the first position to the second position, the heads 24a and 24b are respectively moved by the head moving mechanism and respectively seek desired tracks on the disk 2a via the opening portion 3. Incidentally, the heads 24a and 24b may move in contact with the disk 2a or spaced apart from the disk 2a.

The head moving mechanism moves the heads 24a and 24b between an innermost track and an outermost track on the disk 2a in a radial direction. Due to the head moving mechanism, the heads 24a and 24b can respectively seek the desired tracks. The head moving mechanism comprises a driving device 30. The driving device comprises, as shown in FIGS. 3, 4 and 6, the head arm 25, the head carriage 31, a lead screw 32, a step motor 33, the plate hinge 34 and a guide rail 35. The head arm 25 is coupled to the plate hinge 34 at the end part 25b thereof, and is pivotally engaged with the head carriage 31 via the plate hinge 34. The lead screw 32 has a spiral groove with which the head carriage 31 is engaged. The lead screw 32 is engaged with the step motor 33 so as to be rotated thereby. The head carriage 31 has the fixed arm part 31a with an L-shaped section shown in FIG. 6. The guide rail 35 is inserted into the fixed arm part 31a. As shown in FIGS. 2 and 3, the lead screw 32 and the step motor 33 are respectively aligned in the dimension B in the vicinity of the holder 21. In addition, the guide rail 35 is aligned in the dimension B. Incidentally, the head arm 25 does not have to be aligned in the dimension A.

Figure 1:
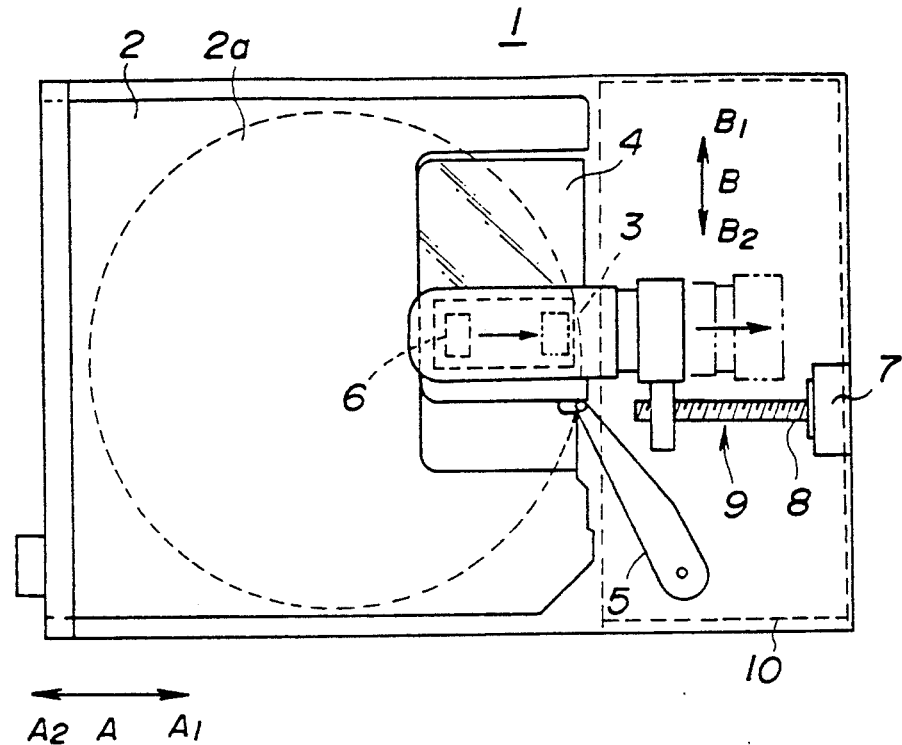
FIG. 1 is a principle plane view of the conventional disk storage.

When the step motor 33 rotates the lead screw 32, the head carriage 31 moves along the guide rail 35 in the dimension B. Thus, the head arm 25 and the fixed arm part 31a respectively move in the dimension B, and thus the heads 24a and 24b respectively move in the dimension B. Due to the guide rail 35, the heads 24a and 24b stably move. Since the heads 24a and the 24b move in the dimension B, it is not necessary to provide a space for the movement of the heads 24a and 24b. Therefore, as shown by double dotted line in FIG. 7. The disk storage 20 according to the present invention can be made thinner in the dimension A than the disk storage 1 shown in FIG. 1. In addition, the fact that the lead screw 2 and the step motor 33 are respectively aligned in the dimension B helps to enable the disk storage 20 to be made thinner in the dimension A. Incidentally, as shown by the one-dotted line in FIG. 2, if the step motor 33 is made longer, greater torque for rotating the lead screw 32 can be obtained.

After the heads 24a and 24b are respectively moved in the desired tracks, the heads 24a and 24b record information on the disk 2a and reproduces information therefrom.

Incidentally, the disk storage 20 may be a magnetic disk storage, a magneto-optical disk storage, and an optical disk storage, etc.

Further, the present invention is not limited to these preferred embodiments, but various variations and modifications may be made without departing from the scope of the present invention.

What is claimed is:

1. A disk storage, comprising:
   a holder into/from which a housing is inserted/ejected, said housing accommodating a disk and having an opening portion extending along a first dimension radial to said disk, an insertion/ejection of said housing being executed along a second dimension approximately orthogonal to said first dimension;
   a head, engaged with said holder, which head, via said opening portion, records information at a predetermined position on said disk and/or reproduces information therefrom when said housing is inserted into said holder;
   head moving means, engaged with said head, for moving said head along said first dimension to said predetermined position on said disk; and
   wherein said housing has an almost quadrate shape as viewed from a third dimension, which third dimension is perpendicular to said first dimension and perpendicular to said second dimension, said almost quadrate shape having first to fourth chamfered corners, the depth of the chamfering at said first chamfered corner being greater than the depth of the chamfering at any one of said second to third chamfered corners, and
   wherein said disk storage further comprises an operating member projecting into said holder so as to prevent said housing from being inappropriately inserted into said holder, said operating member touching said first chamfered corner and being withdrawn to allow said housing to be inserted when said housing is inserted with an appropriate orientation, and said operating member preventing said housing from being inserted with an inappropriate orientation since said operating member does not, in the case of said inappropriate orientation insertion, touch one of said second to fourth corners and thus cannot be withdrawn so as to allow insertion;

and wherein said housing has a shutter which shuts said opening portion of said housing, said operating member moving said shutter so as to expose said opening portion when said housing is to be inserted with the appropriate orientation;

said operating member comprising a torsion spring which has a first end part pivotally supported by said holder on a plane determined by said first dimension and said second dimension, and a second end part bent in said third dimension so as to project into said holder, and when said second end part of said torsion spring touches said first corner, said second end part moves in a direction opposite to an elastic force of said torsion spring so as to allow said housing to be inserted into said holder.

2. The disk storage according to claim 1, wherein said second end part of said torsion spring moves said shutter of said housing.

3. The disk storage according to claim 1, wherein said head moving means comprises:
- a head holding member comprising a first end and a second end thereof, said first end of said head holding member being engaged with said head, and the direction running from said first end to said second end being aligned along said second dimension;
- an engaging member, engaged with said second end of said head holding member, which engaging member has a cylinder shape extending in said first dimension; and
- a driving means for moving said head holding member along said engaging member in said first dimension.

4. The disk storage according to claim 3, wherein said engaging member has a spiral groove for engaging with said head holding member, said driving means comprising a motor which rotates said engaging member.

* * * * *